United States Patent Office 2,721,445
Patented Oct. 25, 1955

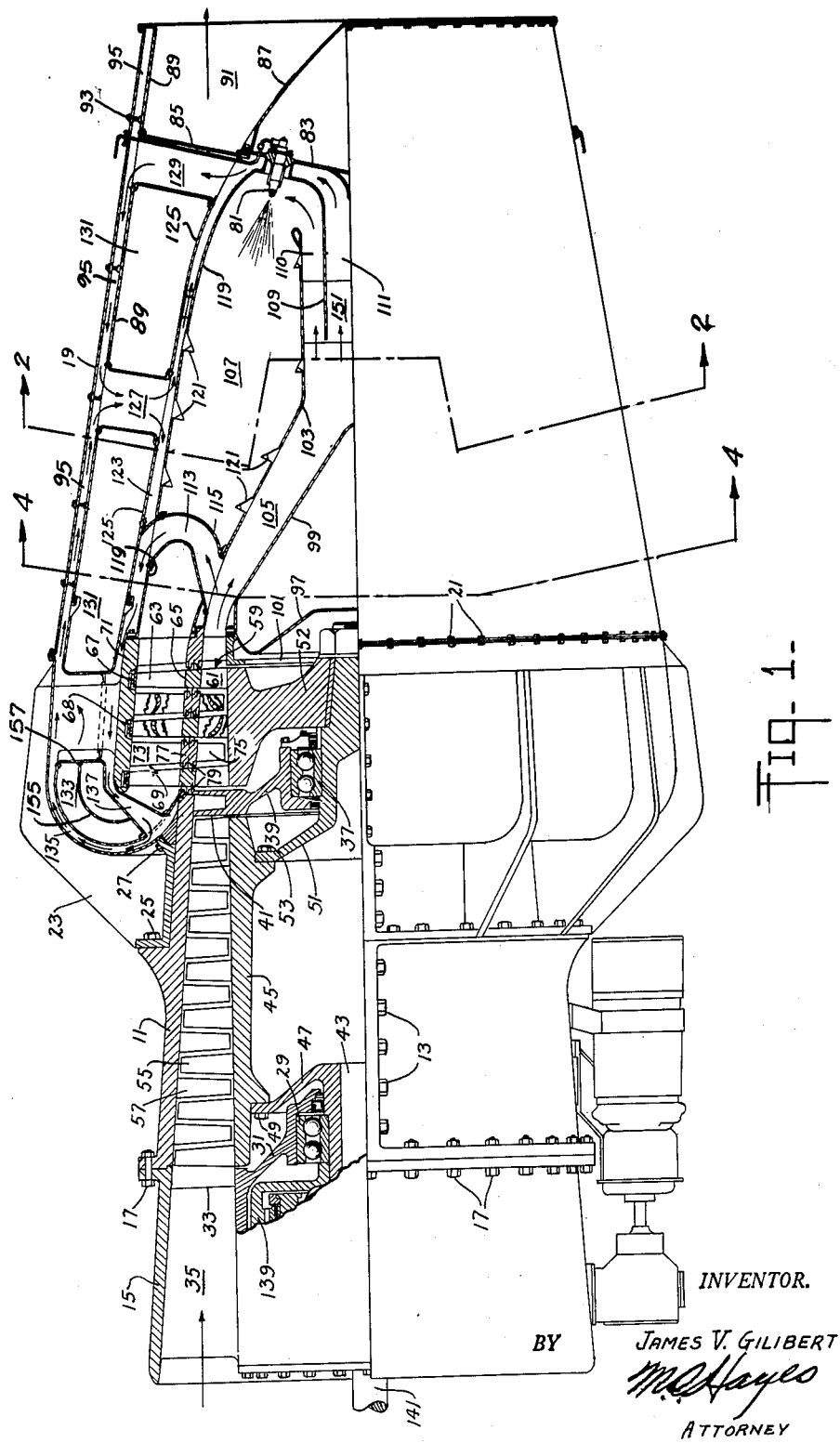

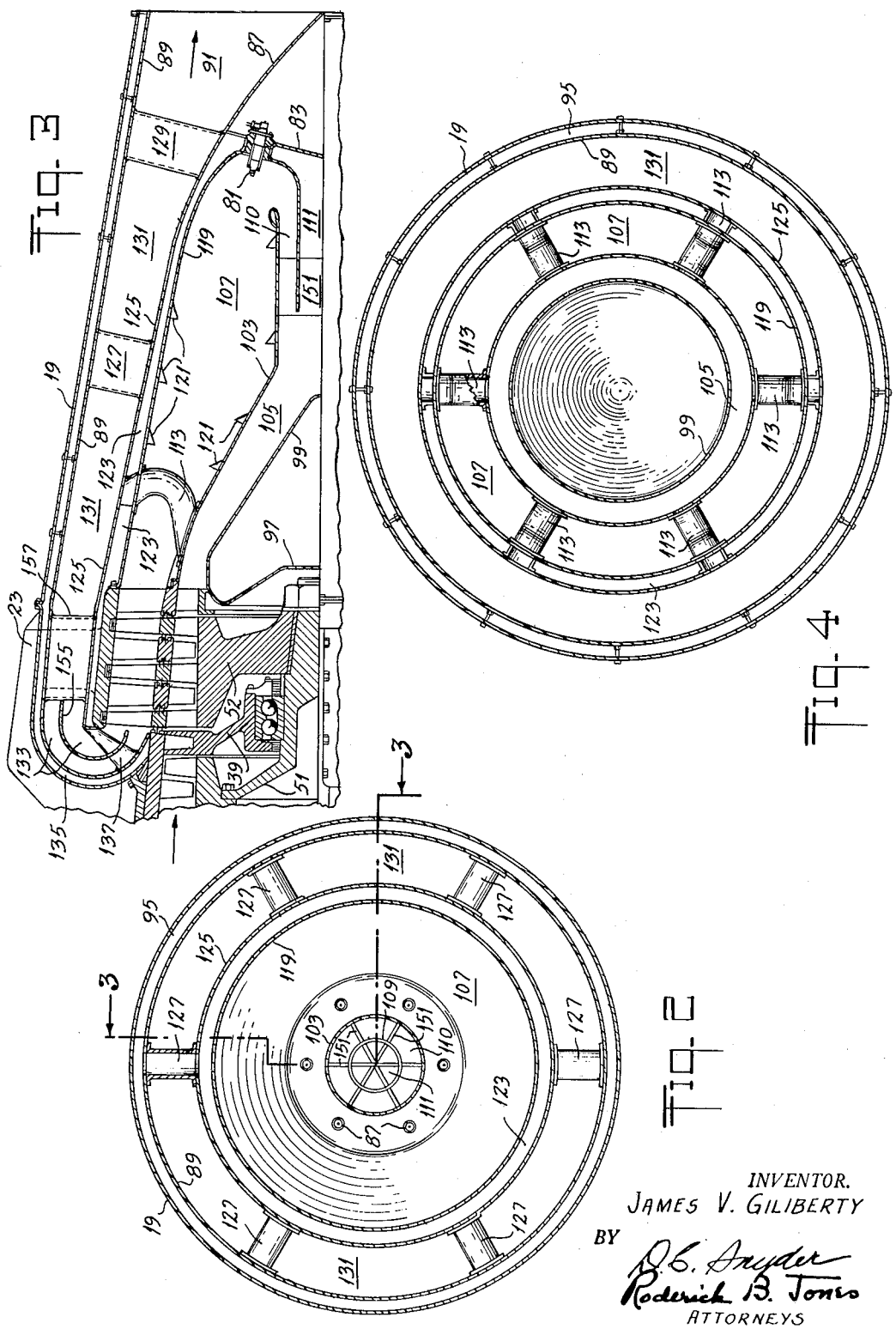

2,721,445

AIRCRAFT PROPULSION PLANT OF THE PROPELLER-JET TURBINE TYPE

James V. Giliberty, West Hempstead, N. Y.

Application December 22, 1949, Serial No. 134,561

3 Claims. (Cl. 60—35.6)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in aircraft power plants, and more particularly pertains to improvements in continuous-combustion gas-turbine-type aircraft power plants deriving auxiliary jet thrust.

The use of combustion gas turbines as energy converters has been retarded by the inability to devise materials that can withstand the relatively high temperatures required for efficient gas-turbine operation, and by associated difficulties in increasing thermal efficiency. The use of heat regenerators and intercoolers in conjunction with gas turbines has had a marked effect in the improvement of thermal efficiency, and the advent of materials that can withstand higher temperatures, and developments in aerodynamic high-efficiency air compressors have abetted adoption of gas turbines as prime movers, but there has remained the principal problem of maintaining high inlet gas temperatures.

The primary object of this invention is to provide a gas turbine propeller-jet prime mover adapted to function at high thermal efficiency by reason of the higher inlet gas temperatures that can be used, the structure permitting operation at temperatures heretofore deemed inordinate.

The novel structure that permits such function includes an air compressor that forms an integral part of the turbine. A single homogeneous blade performs two functions in the unit, one portion of the blade having a curvature most efficient to function as a compressor blade and another portion of the same single blade having a curvature most efficient to function as a gas-turbine blade, said portions being coupled by an integral portion adapted to incorporate a labyrinth seal. By reason of such construction of both the rotating and the stationary blades, the gas-turbine portion of each blade is cooled by direct conduction from the air-compressor portion of that blade, which in turn is maintained relatively cool by the flow of the compressor air.

By providing structure wherein the roots of the rotating blades are in a relatively cool region, considerable reduction in thermal stresses at such roots is effected and creep is minimized. Collaterally, by combining the turbine and the air compressor into a single unit, an appreciable reduction in size and weight relative conventional gas turbines is effected.

Thermal efficiency is increased and heat losses are kept at a minimum by circulation of a portion of the compressor air around the annular jackets of the combustion chamber shells to maintain the combustion chamber relatively cool and by circulating a portion of the compressor air around the annular jackets of the exhaust ducts and cone to thus provide a heat exchanger.

The primary object of the invention, therefore, is to provide a continuous-combustion gas-turbine-type aircraft power plant deriving auxiliary jet thrust, the device being characterized by its feasibility of manufacture and assembly, over-all high efficiency, compactness affording an appreciable reduction in size and weight as compared to conventional gas turbines, means for cooling the bearings, and complete freedom for expansion.

Another object is to provide a combustion gas turbine characterized by a thermal efficiency increased considerably over the thermal efficiency of gas turbines heretofore employed, wherein inlet gas temperatures of an extraordinarily high order can be used.

A further object is to provide a combustion gas turbine adapted for use as an aircraft power plant and having an integral air compressor wherein part of the turbine portion of the blades is in the direct path of flow of the compressor air, thereby affording a positive means of cooling both the stationary and the rotating turbine portions of the blades.

Still another object is to provide a combustion gas turbine adapted for use as an aircraft power plant wherein compressor and turbine functions are both effected with each of a plurality of compound blades, whereby optimum thermal conductivity in cooling the turbine portions of each blade is realized by reason of the homogeneity of the compressor and turbine portions of each such blade.

Another object is to provide a combustion-gas turbine adapted for use as an aircraft power plant and having bearing saddles connected indirectly to the casing so that heat transmission to the rotor bearings is at a minimum and so that efficient cooling and lubrication of the bearings is facilitated.

Other objects and many of the attendant advantages of this invention will be readily appreciated as the same becomes better understood by reference to the following detailed description when considered in connection with accompanying drawings, in which:

Fig. 1 is a fragmentary longitudinal view, partly in elevation and partly in section, of a continuous-combustion gas-turbine aircraft power plant, showing a preferred embodiment of the invention;

Fig. 2 is a section taken on the line 2—2 of Fig. 1 and showing one of the by-pass conduits in section;

Fig. 3 is a fragmentary section taken on the line 3—3 of Fig. 2, and

Fig. 4 is a section taken on the line 4—4 of Fig. 1 and showing one of the by-pass conduits partly broken away.

Similar numerals refer to similar parts throughout the several views.

The compressor and turbine components and the shaft of a propeller driven thereby are carried in a casing that is adapted to be mounted on an aircraft. Said casing comprises a central frusto-conical split shell 11, the halves of said shell being secured together by a plurality of bolts 13, a forward frusto-conical shell 15 secured to shell 11 by a plurality of bolts 17, and an aft frusto-conical shell 19 secured to shell 11 by a plurality of bolts 21 and, through its radially arranged webs 23, by a plurality of bolts 25 and 27.

Main bearing 29 is carried on bearing saddle 31, which in turn is secured to shell 15 by webs 33 to provide an annular inlet chamber 35. Thrust bearing 37 is carried on bearing saddle 39, which in turn is secured to shell 11 by webs 41.

Main drive shaft 43 is carried rotatably in bearings 29 and 37. Rotor 45 is a conical shell secured fixedly to said shaft 43 by fore webs 47 and bolts 49 and by aft webs 51 and 52, and bolts 43, said rotor being carried on said shaft internal central shell 11. Said rotor and said shell define an annular chamber communicating between inlet chamber 35 and the combustion chamber ducts hereinafter described. A plurality of rotor bladings 55 are mounted in spaced relation on the external periphery of said rotor 45. Each of said bladings comprise a multiplicity of blades of airfoil cross-section and of similar aspect. A plurality of stator bladings 57 are mounted similarly on the internal periphery of shell 11 and are each disposed between adjoining rotor bladings 55. Each of said stator bladings 57 comprises a multiplicity of blades of airfoil cross section and of similar aspect, said bladings 55 and 57 thus forming a plurality of compressor stages.

A plurality of rotor bladings 59 are mounted in spaced relation on the external periphery of aft web 52. Each of said bladings comprises a multiplicity of blades of similar aspect, each of said blades having a portion 61 of airfoil cross section extending from the root portion thereof, a portion 63 of airfoil cross section and of aspect reverse to that of the portion 61, said portion 63 lying distal the root portion, and an intermediate separating section 65 dividing portions 61 and 63. Shroud rings 67 and labyrinth seals 68 cap blade portions 63.

A plurality of stator bladings 69 are mounted on the interior periphery of casing member 71, one of the said bladings 69 being positioned between each adjacent pair of rotor bladings 59 and one of said bladings 69 being positioned aft the rearmost rotor blading. Each of said bladings 69 comprises a multiplicity of blades of similar aspect, each of said blades having a portion 73 of airfoil cross section extending from the root thereof, a portion 75 of airfoil cross-section and of aspect reverse to that of the portion 73, said portion 75 being distal said root, and an intermediate section 77 dividing portions 73 and 75. Each said portion 73 preferably has a cross-sectional aspect reverse the cross-sectional aspect of the adjacent portions 63 of the blades of the rotor, and each said portion 75 preferably has a cross-sectional aspect reverse of the cross-sectional aspect of the adjacent portions 61 of the blades of the rotor.

Intermediate sections 65 and 77 each form a complete annulus dividing the chamber defined by aft web 52 and casing member 71 into concentric conical chambers. Said sections are provided with labyrinth seals 79 therebetween permitting rotation of the rotor bladings relative the stator bladings while maintaining a fluid seal between the compressor stages formed by blade portions 61 and 75 and the turbine stages formed by blade portions 63 and 73.

The aft shell 19 houses the combustion chamber, cooling chambers, and the exhaust duct. A plurality of fuel injectors 81 are mounted on a deflecting plate 83, which is secured to shell 19 proximate the aft end of the device by ribs 85 and conical member 87 and annular member 89, said members 87 and 89 defining the exhaust duct 91. Member 89 is secured in spaced relation to shell 19 by bolts 93 to provide a peripheral annular cooling chamber 95. Members 97 and 99, which are secured to the ribbed annulus 101 that is carried by the rearmost stator 69, together with member 103, define annular duct 105 that communicates between the final compressor stage and the combustion chamber 107. A plurality of ribs 151 secure in position the member 103 to form the radially inner wall of combustion chamber 107. Annulus 109 extends from the end of the combustion chamber that carries the fuel injectors 81 to subdivide duct 105 into combustion-chamber admission duct 110 and rear by-pass duct 111. A plurality of by-pass ducts 113 are formed by members 115, which are secured respectively to annular member 103 and the annular member 119 that defines the radially outer combustion chamber wall. Said ducts 113 thus provide by-pass conduits between annular duct 105 and the return duct 123 hereinafter described. Ports 121 in members 103 and 119 permit communication between the return ducts 123, formed by members 125, 119 and aft shell 19, and combustion chamber 107 on the one hand, and permit communication between said combustion chamber and duct 105. Linking ducts 127 and 129 span annular exhaust passage 131 to provide circulation in the manner hereinafter described.

Webs 23 house the turbine discharge ducts 133 and the turbine discharge by-pass ducts 135. Ducts 137 span discharge ducts 133 to link ducts 113 and 123, and by-pass ducts 135.

Reduction gearing 139, which is coupled to main drive shaft 43, drives the propeller shaft 141.

In operation, air is admitted through annular inlet chamber 35 and passes through the successive compressor stages formed by rotor bladings 55 and stator bladings 57, and then through the successive compressor stages formed by dual-function rotor bladings 59 and dual-function stator bladings 69. A portion of the compressed air, upon discharge from the final compressor stage, passes through duct 105, and a portion of the compressor air passing through duct 105, then passes through duct 110 to the combustion chamber 107, where fuel is admitted by injector 81 and combustion is effected. Upon such combustion, passage of gas through the turbine portions of the dual-function stator bladings 69 and the dual-function rotor bladings 59 occurs, with discharge effected through duct 133, and then successively through annular exhaust passage 131 and exhaust duct 91. The opposite direction of flow of air and gas thus minimizes the problem of providing an effective seal between the compressor and turbine portions of each dual function blading. At the gas inlet stage of the turbine the pressure differential between the gas side and the air side of the blading is negligible, so that the work of the labyrinth seal 79 at the gas inlet stage is virtually zero. The greatest pressure differential between the gas side and the air side is at the gas outlet stage of the turbine, but design limitations of seal effectiveness is here compensated for by the fact that the pressure differential is such that the compressor air leakage, if any, travels from the compressor side to the turbine side and therefore functions as an auxiliary method of cooling the labyrinth seals.

In the cooling and regenerative system provided, a portion of the compressor air discharged from the final compressor stage passes through by-pass duct 113 and then through ducts 137, 135 and 127 successively. A portion of the compressor air passing through duct 105 passes through duct 111 and around the outside of the combustion chamber 107, through duct 129 and into cooling chamber 95 and through duct 123 to duct 127, as shown by arrows in the drawing. A portion of the air and gas thus circulated is returned to the combustion chamber 107 through the ports 121.

It is thus apparent that the device described accomplishes the objects hereinabove stated. The structure permits inlet gas temperatures heretofore deemed inordinate to be employed, thereby increasing thermal efficiency appreciably. Size and weight of the device relative conventional compressor-turbine energy converters of equivalent output is small by reason of the structure whereby the air compressor is an integral part of the turbine. A corollary feature, the provision of a single homogeneous blade functioning as both a compressor and a turbine rotor blade, and a single homogeneous blade functioning as both a compressor and a turbine stator blade, allows the gas-turbine portion of the blades to be cooled by direct conduction through the medium of the air compressor portion of the blades, which in turn are maintained relatively cool by the flow of the compressor air.

Thermal efficiency is enhanced by positioning the roots of the rotating blades in a relatively cool region, thus reducing considerably the thermal stresses at such roots and minimizing creep. In addition, heat transmission to the bearings is at a minimum, since the bearing saddles are connected indirectly to the high-temperature casing.

The combustion chamber proper is maintained relatively cool by circulation of a portion of the compressor air around the annular jackets of the combustion chamber shells. Finally, a portion of the compressor air circulates around the annular jackets of the exhaust ducts and chamber, thus acting as a heat exchanger and further increasing the thermal efficiency of the unit.

Obviously many modifications and variations of the present invention are possible in the light of the above teachings. It is therefore to be understood that within the scope of the appended claims the invention may be practiced otherwise than as specifically described.

I claim:

1. An aircraft propulsion plant of the propeller-jet turbine type comprising a casing having an inlet for driving fluid, a shaft mounted in said casing and adapted to drive a propeller, said shaft carrying a plurality of compressor stages in communication with said inlet and a plurality of turbine stages in communication with said compressor stages through a flow-reversing jacketed combustion chamber adjacent the final compressor stage and the first turbine stage, said chamber having a partitioning annulus to reverse such flow, an outlet for driving fluid including an exhaust duct and an exhaust cone communicating with the final turbine stage, selected compressor and turbine stages each having a common rotor and a common stator, and means to circulate a portion of the compressor air around the jacket of said combustion chamber and said exhaust duct and cone and comprising conduits around said jacket and cone in communication with said chamber.

2. An aircraft propulsion plant of the propeller-jet turbine type comprising a casing, a propeller drive shaft carried rotatable in thrust and sleeve bearings in said casing, a rotor secured to said drive shaft, a first plurality of bladings carried on the exterior periphery of said rotor, each such blading including a multiplicity of blades each having portions of airfoil cross section proximate and distal said rotor and an intermediate partitioning portion, a second plurality of bladings carried on the internal periphery of said casing and intercalated with selected first bladings, each such second blading including a multiplicity of blades each having portions of airfoil cross section proximate and distal said casing and an intermediate partitioning portion, said rotor and stator partitioning portions defining concentric compressor and turbine stages, a flow-reversing jacketed combustion chamber adjacent and in communication with said compressor and turbine stages, said chamber having a partitioning annulus to reverse such flow, an outlet for driving fluid including an aft exhaust cone carried by said casing and communicating with the final turbine stage, and means to circulate a portion of the compressor air around the jacket of said combustion chamber and said exhaust cone and comprising conduits around said jacket and cone in communication with said chamber.

3. An aircraft propulsion plant of the propeller-jet turbine type comprising a casing, an air inlet in said casing, a power take-off shaft mounted rotatably in the bearings of spaced annular saddles secured to said casing, a rotor carried within said casing by said shaft, a plurality of first compressor stages fed from said inlet and comprising rotor bladings secured to said rotor and stator bladings intercalated with said rotor bladings and secured to said casing, a plurality of duplex stages comprising rotor bladings having an intermediate homogeneous partitioning portion and being secured to said rotor and stator bladings having an intermediate homogeneous partitioning portion and being intercalated with the duplex stages rotor bladings and secured to said casing, said partitioning portions together subdividing said duplex stages into a plurality of second compressor stages downstream of said first compressor stages and a plurality of turbine stages radially outward of said second compressor stages, a flow-reversing jacketed combustion chamber adjacent and communicating between said second compressor and said turbine stages, means to by-pass a portion of the compressor air around said combustion chamber and said turbine bladings, means to deliver a portion of said by-passed air into said combustion chamber, and an annular exhaust cone adapted to discharge turbine gas axially aft, said cone including a circumscribing chamber in communication with said means to by-pass said air into said combustion chamber.

References Cited in the file of this patent

UNITED STATES PATENTS

| | | |
|---|---|---|
| 2,244,467 | Lysholm | June 3, 1941 |
| 2,391,779 | Griffith | Dec. 25, 1945 |
| 2,413,225 | Griffith | Dec. 24, 1946 |
| 2,428,330 | Heppner | Sept. 30, 1947 |
| 2,441,488 | Howell | May 11, 1948 |
| 2,489,683 | Stalker | Nov. 29, 1949 |
| 2,548,975 | Hawthorne | Apr. 17, 1951 |
| 2,584,878 | Howell | Feb. 5, 1952 |
| 2,600,235 | Galliot | June 10, 1952 |
| 2,635,420 | Jonker | Apr. 21, 1953 |

FOREIGN PATENTS

| | | |
|---|---|---|
| 587,513 | Great Britain | Apr. 29, 1947 |
| 592,615 | Great Britain | Sept. 24, 1947 |

(Corresponds to U. S. #2,548,975)